(12) United States Patent
Kuskov et al.

(10) Patent No.: US 9,407,658 B1
(45) Date of Patent: Aug. 2, 2016

(54) SYSTEM AND METHOD FOR DETERMINING MODIFIED WEB PAGES

(71) Applicant: Kaspersky Lab ZAO, Moscow (RU)

(72) Inventors: Vladimir A. Kuskov, Moscow (RU); Alexander A. Romanenko, Moscow (RU); Oleg V. Kupreev, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

(21) Appl. No.: 14/834,853

(22) Filed: Aug. 25, 2015

(30) Foreign Application Priority Data

Jun. 30, 2015 (RU) .................................. 2015125971

(51) Int. Cl.
*G06F 21/00* (2013.01)
*H04L 29/06* (2006.01)
*G06F 17/30* (2006.01)

(52) U.S. Cl.
CPC .......... *H04L 63/145* (2013.01); *G06F 17/3089* (2013.01); *G06F 17/30106* (2013.01); *H04L 63/1416* (2013.01)

(58) Field of Classification Search
CPC ................................................... H04L 63/168
See application file for complete search history.

(56) References Cited

U.S. PATENT DOCUMENTS

| | | | | |
|---|---|---|---|---|
| 8,677,481 | B1 * | 3/2014 | Lee ........................ | H04L 63/168 726/22 |
| 8,893,294 | B1 * | 11/2014 | Steele, III ......... | G06F 17/30902 715/234 |
| 8,959,643 | B1 * | 2/2015 | Invernizzi ........... | H04L 63/1425 713/187 |
| 2010/0192227 | A1 * | 7/2010 | Dai ........................ | G06F 21/56 726/24 |
| 2011/0219448 | A1 * | 9/2011 | Sreedharan ............. | G06F 21/00 726/23 |
| 2011/0219451 | A1 * | 9/2011 | McDougal ............ | G06F 21/562 726/23 |
| 2013/0347104 | A1 * | 12/2013 | Raber ..................... | G06F 21/55 726/22 |

(Continued)

FOREIGN PATENT DOCUMENTS

EP 2199940 A2 6/2010
EP 2529304 A1 12/2012

(Continued)

OTHER PUBLICATIONS

Paul Baecher et al. "The Nepenthes Platform: An Efficient Approach to Collect Malware"; Jan. 1, 2006, Recent Advances in Intrusion Detection Lecture Notes in Computer Science;;LNCS, Springer, Berlin, DE, pp. 165-184, XP019042892, ISBN: 978-3-540-39723-6.

(Continued)

*Primary Examiner* — Morshed Mehedi
(74) *Attorney, Agent, or Firm* — Arent Fox LLP; Michael Fainberg

(57) ABSTRACT

Disclosed is a system and method for determining modified web pages. An example method includes: extracting a plurality of malware trigger code fragments from a configuration file of the malicious software; creating a verification web page by adding the plurality of malware trigger code fragments into a template page; storing, in a database, data relating to an initial state of the verification web page; opening the verification web page and identifying data relating to an opened state of the verification web page; comparing the data relating to the initial state and the data relating to the opened state of the verification web page; and based on detected differences between the data relating to the initial state and the data relating to the opened state of the verification web page, identifying at least one modified code fragment of the verification web page.

20 Claims, 4 Drawing Sheets

(56) References Cited

U.S. PATENT DOCUMENTS

2014/0281919 A1 9/2014 Marco et al.
2014/0283084 A1 9/2014 Lim
2015/0052611 A1* 2/2015 Wang .................... G06F 21/561
                                                                726/24

FOREIGN PATENT DOCUMENTS

EP       2642715 A1    9/2013
RU     2010130874 A    1/2012
RU     2012113255 A   10/2013
WO     2008057755 A2   5/2008
WO     2014150787 A1   9/2014

OTHER PUBLICATIONS

Jamie Van Randwyk et al. "FARM: An Automated Malware Analysis Environment" Security Technology, 2008. ICCST 2008. 42nd Annual IEEE International Carnahan Conference on, IEEE, Piscataway, NJ, USA, Oct. 13, 2008, pp. 321-325, XP031407063, ISBN: 978-1-4244-1816-9.

European Search report of Feb. 12, 2016.

* cited by examiner

SYSTEM AND METHOD FOR DETERMINING MODIFIED WEB PAGES

CROSS-REFERENCE TO RELATED APPLICATIONS

This application claims benefit of priority under 35 U.S.C. 119(a)-(d) to a Russian Application No. 2015125971 filed on Jun. 30, 2015, which is incorporated by reference herein

FIELD OF TECHNOLOGY

The present disclosure relates generally to the field of computer security, and, more particularly, to a system and method for determining modified web pages.

BACKGROUND

Currently, the number of personal computing devices is on the rise. Computers and mobile devices work under the control of various operating systems and solve diverse problems. Many users use these devices for Internet browsing.

In addition, new malicious software (malware) is being constantly developed, including computer viruses, Trojan horses, and Internet worms. A significant portion of this malware is aimed at attacking users working on the Internet. One of the popular type of attacks on Internet users is an attack in which malicious software replaces the contents of a web page being displayed to the user. The malicious software performs an insertion of HTML code into the web page. Often this attack is known as the "man in the browser" or a "web code injection". The attack may start with the use of a Trojan application, for example, which installs in the victim's web browser a malicious extension or plugin which is launched when the browser is restarted. Then comes an interception of the user's traffic which is destined for a particular web site (most often a banking site). Next, the web page being displayed to the user is modified at the stage of downloading or opening), making it possible to modify the external appearance of a particular element of the web page, steal the victim's authentication data as it is being entered, or redirect the funds being transferred by the user to a different account.

Current technical solutions aimed at increasing the safety of the working of a user on the Internet take into account attacks injecting malicious code into a web page. However, they do not provide effective solutions for determining whether a web page has been modified by malicious software.

SUMMARY

Disclosed are system and method for determining modified web pages. According to an exemplary aspect, a method includes extracting a plurality of malware trigger code fragments from at least one configuration file of the malicious software; creating a verification web page by adding the plurality of malware trigger code fragments into a template page; storing, in a database, data relating to an initial state of the verification web page; opening the verification web page and identifying data relating to an opened state of the verification web page; comparing the data relating to the initial state and the data relating to the opened state of the verification web page; and based on detected differences between the data relating to the initial state and the data relating to the opened state of the verification web page, identifying at least one modified code fragment of the verification web page.

According to one aspect, the method includes opening of the verification web page by opening the verification web page by a web browser.

According to one aspect, the creating of the verification web page comprises creating the verification web page according to at least one or more of a limit on a maximum number of pages, a limit on a maximum size of all pages together, a limit on a maximum size of one page, and a limit on a length of a URL comprising not more than 1500 characters.

According to one aspect, the method includes storing the at least one configuration file of the malicious software in database of malicious software configuration files.

According to one aspect, the method includes selecting, by the hardware processor, the at least one configuration file for the creating of the verification web page according to a plurality of criteria.

According to one aspect, the plurality of criteria include a time interval and a frequency of injection code in the at least one configuration file.

According to one aspect, the method includes selecting the plurality of code fragments for the creating of the verification web page by selecting N fragments from the at least one configuration file of the malicious software with most popular injection codes, wherein the number N is determined according to limits on the size of the verification web page.

According to one aspect, the method includes executing, by a virtual machine, code in the at least one modified code fragment to analyze behavior of the malicious software.

According to one aspect, the method includes analyzing, by the hardware processor, a URL code in the at least one modified code fragment of the verification web page; and identifying, by the hardware processor, at least one link to a phishing resource.

According to another exemplary aspect, a system is disclosed for determining a web page modified by malicious software. According to this aspect, the system includes at least one database configured to store at least one configuration file of the malicious software; and a hardware processor configured to extract a plurality of malware trigger code fragments from at least one configuration file of the malicious software, create a verification web page by adding the plurality of malware trigger code fragments into a template page, store, in the at least one database, data relating to an initial state of the verification web page, open the verification web page and identify data relating to an opened state of the verification web page, compare the data relating to the initial state and the data relating to the opened state of the verification web page, and based on detected differences between the data relating to the initial state and the data relating to the opened state of the verification web page, identify at least one modified code fragment of the verification web page.

According to another exemplary aspect, a non-transitory computer readable medium storing computer executable instructions for determining a web page modified by malicious software is disclosed. According to this aspect, instructions are included for extracting a plurality of malware trigger code fragments from at least one configuration file of the malicious software; creating a verification web page by adding the plurality of malware trigger code fragments into a template page; storing, in a database, data relating to an initial state of the verification web page; opening the verification web page and identifying data relating to an opened state of the verification web page; comparing the data relating to the initial state and the data relating to the opened state of the verification web page; and based on detected differences between the data relating to the initial state and the data relating to the opened state of the verification web page, identifying at least one modified code fragment of the verification web page.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method, and computer program product for determining modified web pages. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The following disclosure introduces a number of definitions and concepts that will be used in describing various aspects of the disclosed systems and methods.

"Configuration files" of malicious software are binary files (e.g., text, XML, JSON and the like) that store the settings of the malicious software, especially the addresses of the command servers, the URL addresses of the targets of attacks (or their fragments and masks), and the actual web page injection code.

"Web page injection code" is the code that is injected by the malicious software into the web page being displayed to the user. The code usually carries a functionality that can inflict harm on the confidentiality of the user's data (for example, phishing attacks, as a result of which the user may lose control over his account records) or financial harm to the user (for example, replacing the recipient when conducting online payments).

Figure 1:
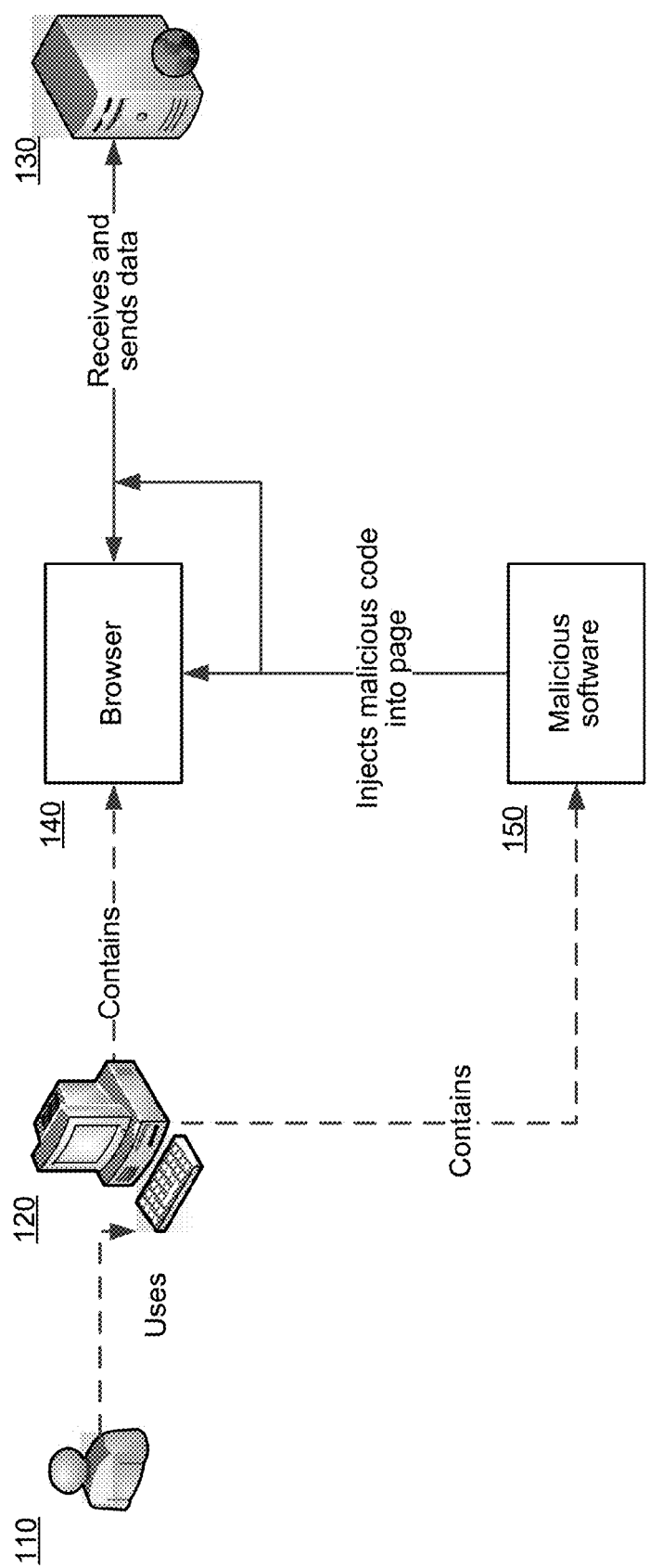
FIG. 1 illustrates an example of a user working in a network using a web browser.

FIG. 1 illustrates an example of a user working in a network using a web browser. As shown, the user 110, working on a computing device 120 (such as a personal computer, mobile telephone, notebook), can make use of servers 130. The servers 130 can be web servers, containing various web pages, email servers, and database servers. In general, the user 110 accesses a server 130 by a browser 140, such an Internet Explorer® or the like.

As described above, malicious software 150 can be present on the computing device 120 of the user 110. The malicious software 150 can inject malicious code into a web page received from the server 130 and opened in the browser 140.

In order to detect the presence of malicious software 150 on the computing device 120 of the user 110, one can use a web page containing HTML fragments linking to sites and network resources that may in turn be the target of attack of the malicious program 150. In general, after opening the web page on the computing device 120 of the user 110, the malicious software 150 changes the web page, adding its injection code to it. The state of the web page after opening may be saved, and then the modified code fragments may be identified in it. If such code fragments are found, this may indicate the presence of malicious software 150 on the computing device 120 of the user 110. After more detailed analysis of the web page modifications, a decision is made as to the presence of malicious software 150.

Figure 2:
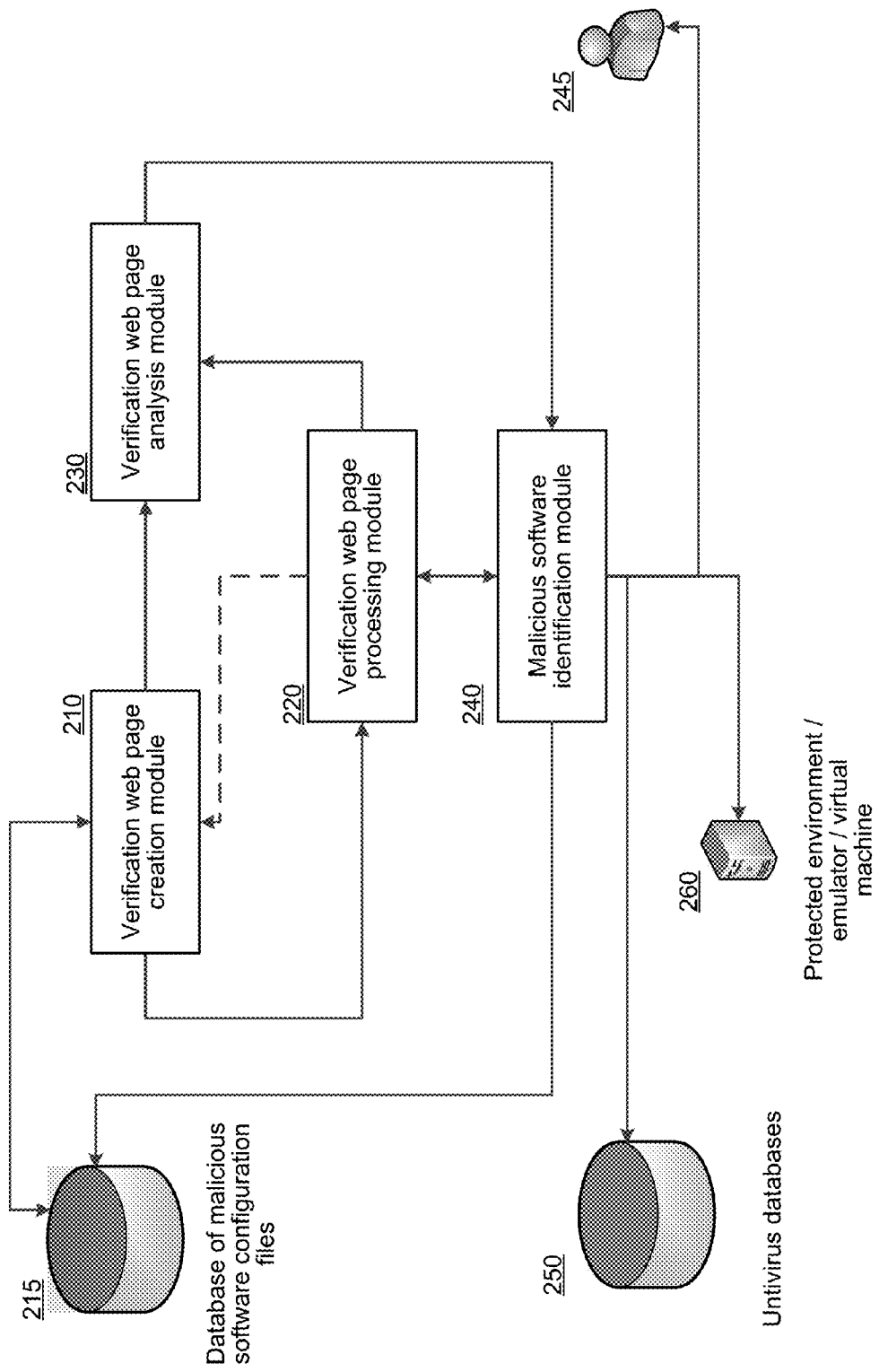
FIG. 2 illustrates a block diagram of a system for determining modified web pages according to an exemplary aspect.

FIG. 2 illustrates a block diagram of a system for determining a modified web page according to an exemplary aspect. In an exemplary aspect, a verification web page creation module 210 creates a verification web page from a template page (e.g., a page that contains standard html headers and various standard html code and text elements). In the general case, the verification web page is created by module 210 by adding to the template page fragments of html code, such as the exemplary code "<head><body input type="password">" and the like, which are known to trigger activation of known web code injection malware.

In one exemplary aspect, the fragments of html code may be extracted by the verification web page creation module 210 from the configuration files of known malicious program 150 and added to the verification web page as will be explained in greater detail below. Subsequently, during opening of the verification web page on the user's computer, the malicious program 150 present on the user's computer may modifying verification web page by injecting its own code into the verification web page.

In order to trigger a malicious program to modify the verification web page, it is necessary for this malicious program to discover the necessary fragment in the URL address and the necessary fragment in the verification web page itself. Therefore, for each of the page fragments, an address fragment can be added to the URL. In one exemplary aspect, website addresses and their fragments may be retrieved from the configuration files of known malware. Examples of address fragments may include, but not limited to: a URL of a bank website, which appears in the configuration files of malware known to attack websites of banks; and a URL that contains words that are used in attacks and are indicated in the configuration files of malicious software (e.g., login, password or authorization data).

In one exemplary aspect, the verification web page can consist of several web pages created by the verification web page creation module 210. In one exemplary aspect, the verification web page may be created on the basis of certain criteria, such as: a limit on the maximum number of web pages (templates); a limit on the maximum size of all pages taken together; a limit on the maximum size of one page; a limit on the length of the URL comprising not more than 1500 characters; and other criteria.

According to one aspect, the configuration files of the malicious program may be stored in a database of malicious software configuration files 215. The verification web page creation module 210 can determine criteria for selecting the malicious software configuration files. According to one aspect, the criteria can be one or more of the following, for example: a time interval (e.g., six months from the present date); and the popularity of the injection code (how often the given particular injection code is encountered in malware configuration files).

In one exemplary aspect, the verification web page creation module 210 selects N fragments from the malicious software configuration files with the most popular injection codes, the number N itself being determined by limits on the size of the verification web page. For example, if the criterion "limit on the maximum size of one page" equal to X (e.g., 1024 bytes) is used to create the verification web page, then fragments are selected from the malicious software configuration files with the most popular injection codes and added to the verification web page until its size exceeds the size X specified by the criterion. Data on the popularity of injection codes can be saved in the database of malicious software configuration files 215.

In one exemplary aspect, the verification web page creation module 210 when creating the verification web page may identify the site which the user is working with. Thus, for example, if the user has visited a site of a particular bank, the verification web page creation module 210 may select from the database of malicious software configuration files 215 known configuration files of malicious software that are known to be used for attacks on the users of this bank. Then, in one exemplary aspect, the verification web page is created by the module 210 with the use of fragments from the just selected configuration files of malicious software. In another exemplary aspect, when creating the verification web page, fragments from selected configuration files of malicious software are used as well as fragments from configuration files of malicious software with the most popular/frequent injection codes.

In one exemplary aspect, for the composition of the verification web page, the module 210 may add only unique fragments when creating the verification web page (that is, no two identical fragments should be present on the web page being created). However, it should be appreciated that the presence of two identical fragments on the same verification web page does not impede the working of this system according to the exemplary aspect.

It should be noted that, depending on the changing of the criteria, the verification web page may be modified by the module 210 in arbitrary (random) manner, but its final appearance may not important. It is only necessary for the verification web page to contain malware trigger code fragments. The order of these fragments and their formatting (e.g., spaces, quotation marks, commentaries) are not critical according to the exemplary aspect.

Furthermore, according to the exemplary aspect, the created verification web page may be sent by the verification web page creation module 210 to a verification web page processing module 220 and a verification web page analysis module 230.

In one exemplary aspect, the verification web page processing module 220 receives the verification web page from the verification web page creation module 210 and opens it. In one aspect, the web page may be opened using a web browser. In yet another aspect, the verification web page processing module 220 itself opens the verification web page.

According to one aspect, the verification web page processing module 220 does not display the page to the user. In another aspect, the verification web page is sent asynchronously, for example by means of AJAX (asynchronous Javascript and XML). It is not critical to display the page to the user, since the correct formatting of the verification web page is not guaranteed.

In one exemplary aspect, the verification web page processing module 220 intercepts the user's accessing of a website and sends the URL address of the access website to the verification web page creation module 210.

It should be noted that the verification web page processing module 220 may contain various mechanisms of alerting the user and interacting with the user, for example, sending text or audio messages to the user or blocking the user's data entry.

Most often, malicious software injects its code during the loading of the web page on the user's computer, and also at the moment of opening of the web page by the browser of the user's computer. Therefore, after opening the verification web page, the verification web page processing module 220 may save the state of the verification web page after opening and sends its code to the verification web page analysis module 230. In one example aspect, the state data may include the code of the verification web page, such as HTML and Java-Script, which is a client-side browser uses to create the appearance of the page. In another example aspect, the state data may include the code of the verification web page as well as various resources (e.g., images, video, audio, and other content), which are presented on the page.

The verification web page analysis module 230 is configured to compare the original (initial) web page received from the verification web page creation module 210 and the page received from the verification web page processing module 220, and identify the changes in the state of the verification web page. Thus, for example, the verification web page might have been changed at the moment of opening by the browser itself (e.g., contextual advertising in Google Chrome®), by a browser extension (advertising blocking modules), by a security application (blocking of certain fragments according to parental control rules) and by others.

After identifying web page modifications, the verification web page analysis module 230 determines the changes related to the fragments that were added in the verification web page by the verification web page creation module 210. In one exemplary aspect, the verification web page analysis module 230 compares the code of the fragments in terms of a hash (for example, SHA1). Thus, for example, the hash is calculated and compared for each fragment of the verification web page received from the verification web page creation module 210, as is the hash for the fragments of the page received from the verification web page processing module 220. If the verification web page analysis module 230 has found such changes of fragments, the verification web page may be considered suspicious and sent to a malicious software identification module 240 for malware analysis.

In one exemplary aspect, the malicious software identification module 240 is configured to determine if the verification web page has been modified by malicious software. In one exemplary aspect, the page may be checked against an antivirus database 250, with the help of which it is possible to detect malicious software injection code. In general, the antivirus database 250 may store data used by signature-based and/or heuristic analysis of files that may be performed by the malicious software identification module 240 in one exemplary aspect. A situation can occur when a webpage has been modified, but it is unclear what caused this modification (perhaps a new malware). It is hard to make a definitive conclusion, but it is possible to warn the user about a suspicious webpage, and to send the state data of the page (e.g., its code and resources) for the in-depth analysis for malware by module 240 or remote antivirus server. If the malicious software identification module 240 detects modifications of the verification webpage, it can conclude that a malicious software is present on the computer on which the verification web page was opened by module 220. In another aspect, the verification web page may be analyzed by a security expert 245.

In one exemplary aspect, the malicious software identification module 240 can use a protected environment, an emulator or a virtual machine 260 for analysis of the behavior of the injected code. Thus, for example, in the case when an additional code has been found in the modified fragment (e.g., in JavaScript language), this code can be run in the virtual machine for analysis of its actions by the malicious software identification module 240.

In one exemplary aspect, the malicious software identification module 240 may analyze the URL address which was added to the modified fragment and discover links to phishing resources. In yet another aspect, if changes are discovered that are executed by the malicious software, the malicious software identification module 240 reports the discovered changes on the page to the verification web page processing module 220. The verification web page processing module 220 in turn informs the user as to the discovery or blocks the keyboard entry, for example, for the purpose of protecting the user's data.

Figure 3:
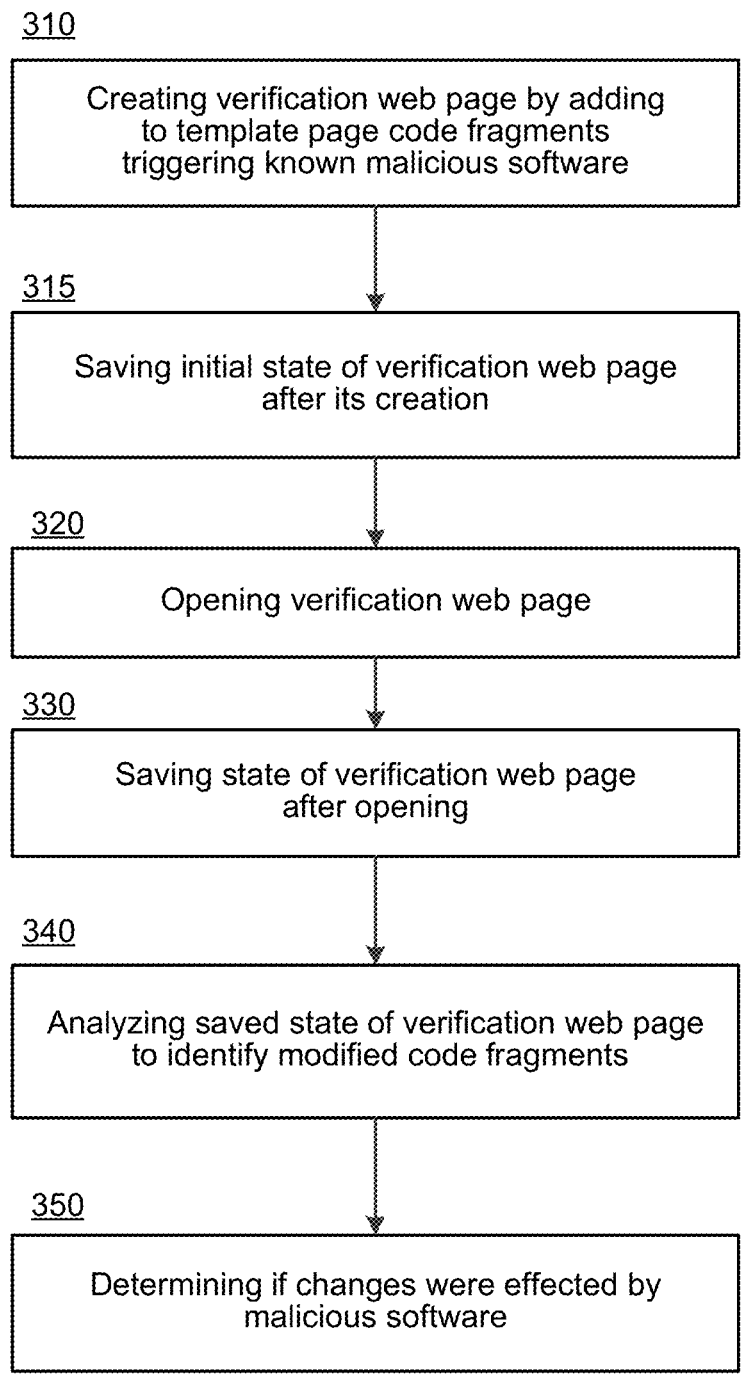
FIG. 3 illustrates a flowchart for a method for determining modified web pages according to an exemplary aspect.

FIG. 3 illustrates a flowchart for a method for determining a web page modified by malicious software according to an exemplary aspect. As shown, in the initial step 310, the verification web page is created by the verification web page creation module 210, which adds malware trigger HTML code fragments into a template page. The code fragments are added base on the criteria described above with respect to FIG. 2, for example. When creating the verification web page, the configuration files of malicious software that are stored in the database 215 are used to identify, for example, popular injection codes and their triggers.

Next, in step 315, the initial state of the verification web page is saved and sent to the verification web page analysis module 230. Then, in step 320, the verification web page is opened by the verification web page processing module 220. In one exemplary aspect, the verification web page is opened with the use of a web browser. In another exemplary aspect, the verification web page processing module 220 itself opens the verification web page. Next, in step 330, with the help of the verification web page processing module 220, the opened state of the verification web page is saved and sent to the verification web page analysis module 230.

Furthermore, in step 340, the saved state of the verification web page is analyzed by the verification web page analysis module 230 in order to identify the modified web page fragments. During this process, the code of the initial state of the verification web page is compared with the code of the state of the verification web page after it is opened. If a modified code fragment is found, in step 350 the malicious software identification module 240 determines whether the verification web page was modified by the malicious software. In one exemplary aspect, the verification web page is checked with the use of special databases 250, with the help of which it is possible to detect malicious software injection code.

In another exemplary aspect, the verification web page may be analyzed by a security expert 245. In yet another exemplary aspect, a protected environment, emulator or virtual machine 260 is used for analysis of the behavior of the code injected into the verification web page. In one exemplary aspect, the URL code which was added to the modified fragment is analyzed, and links to phishing resources are identified. If detected, a conclusion is drawn as to the presence of malicious software on the computer that was used to open the template page by the verification web page processing module 220.

Figure 4:
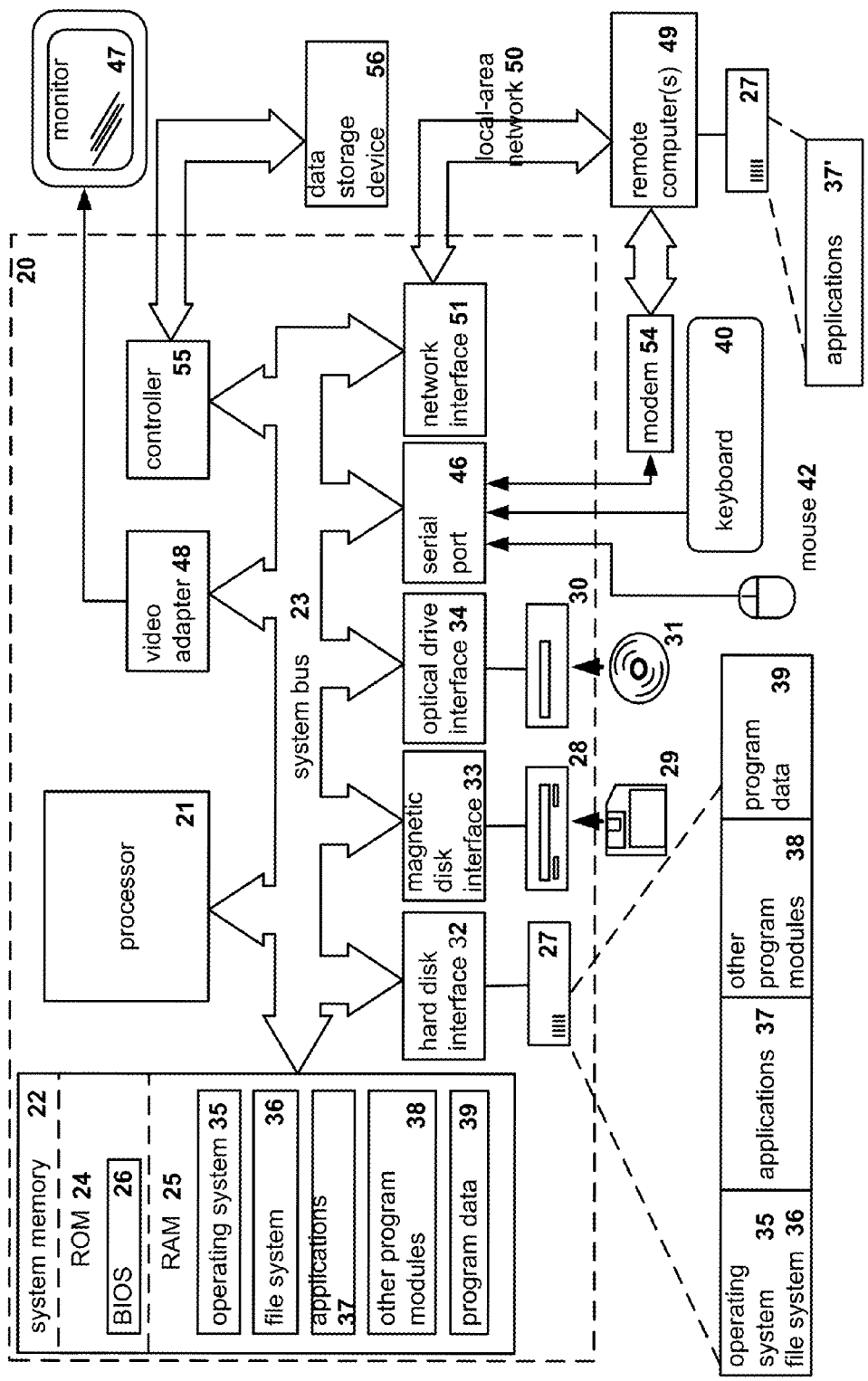
FIG. 4 illustrates an example of a general-purpose computer system on which the disclosed system and method can be implemented according to an example aspect.

FIG. 4 illustrates an example of a general-purpose computer system (which may be a personal computer or a server) on which the disclosed systems and method can be implemented according to an example aspect. As shown, the computer system includes a central processing unit 21, a system memory 22 and a system bus 23 connecting the various system components, including the memory associated with the central processing unit 21. The system bus 23 is realized like any bus structure known from the prior art, containing in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate in a network environment, using a network connection to one or more remote computers 49. The remote computer (or computers) 49 are also personal computers or servers having the majority or all of the aforementioned elements in describing the nature of a personal computer 20, as shown in FIG. 3. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 6 above). Accordingly, each module can be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for determining modified web pages, the method comprising:
   extracting, by a hardware processor, a plurality of malware trigger code fragments from at least one configuration file of a malicious software;
   creating, by the hardware processor, a verification web page by adding the plurality of malware trigger code fragments into a template page;
   storing, in a database, data relating to an initial state of the verification web page;
   opening the verification web page and identifying data relating to an opened state of the verification web page;
   comparing, by the hardware processor, the data relating to the initial state and the data relating to the opened state of the verification web page; and
   based on detected differences between the data relating to the initial state and the data relating to the opened state of the verification web page, identifying at least one modified code fragment of the verification web page.

2. The method of claim 1, wherein the opening of the verification web page comprises opening the verification web page by a web browser.

3. The method of claim 1, wherein the creating of the verification web page comprises creating the verification web page according to at least one or more of a limit on a maximum number of pages, a limit on a maximum size of all pages together, a limit on a maximum size of one page, and a limit on a length of a URL comprising not more than 1500 characters.

4. The method of claim 1, further comprising storing the at least one configuration file of the malicious software in database of malicious software configuration files.

5. The method of claim 4, further comprising selecting, by the hardware processor, the at least one configuration file for the creating of the verification web page according to a plurality of criteria.

6. The method of claim 5, wherein the plurality of criteria include a time interval and a frequency of injection code in the at least one configuration file.

7. The method of claim 4, further comprising selecting the plurality of code fragments for the creating of the verification web page by selecting N fragments from the at least one configuration file of the malicious software with most popular injection codes, wherein the number N is determined according to limits on the size of the verification web page.

8. The method of claim 1, further comprising executing, by a virtual machine, code in the at least one modified code fragment to analyze behavior of the malicious software.

9. The method of claim 1, further comprising:
   analyzing, by the hardware processor, a URL code in the at least one modified code fragment of the verification web page; and
   identifying, by the hardware processor, at least one link to a phishing resource.

10. A system for determining modified web pages, the system comprising:
  at least one database configured to store at least one configuration file of a malicious software; and
  a hardware processor configured to:
    extract a plurality of malware trigger code fragments from at least one configuration file of the malicious software,
    create a verification web page by adding the plurality of malware trigger code fragments into a template page,
    store, in the at least one database, data relating to an initial state of the verification web page,
    open the verification web page and identify data relating to an opened state of the verification web page,
    compare the data relating to the initial state and the data relating to the opened state of the verification web page, and
    based on detected differences between the data relating to the initial state and the data relating to the opened state of the verification web page, identify at least one modified code fragment of the verification web page.

11. The system of claim 10, wherein the hardware processor is further configured to open the verification web page in a web browser.

12. The system of claim 10, wherein the hardware processor is further configured to create of the verification web page according to at least one or more of a limit on a maximum number of pages, a limit on a maximum size of all pages together, a limit on a maximum size of one page, and a limit on a length of a URL comprising not more than 1500 characters.

13. The system of claim 10, wherein the at least one database is further configured to store the at least one configuration file of the malicious software.

14. The system of claim 13, wherein the hardware processor is further configured to select the at least one configuration file for the creating of the verification web page according to a plurality of criteria.

15. The system of claim 14, wherein the plurality of criteria include a time interval and a frequency of injection code in the at least one configuration file.

16. The system of claim 13, wherein the hardware processor is further configured to the plurality of code fragments for the creating of the verification web page by selecting N fragments from the at least one configuration file of the malicious software with most popular injection codes, wherein the number N is determined according to limits on the size of the verification web page.

17. The system of claim 10, wherein the hardware processor is further configured to run a virtual machine to execute code in the at least one modified code fragment to analyze behavior of the malicious software.

18. The system of claim 1, wherein the hardware processor is further configured to:
  analyze a URL code in the at least one modified code fragment of the verification web page; and
  identify at least one link to a phishing resource.

19. A non-transitory computer readable medium storing computer executable instructions for determining modified web pages, including instructions for:
  extracting a plurality of malware trigger code fragments from at least one configuration file of a malicious software;
  creating a verification web page by adding the plurality of malware trigger code fragments into a template page;
  storing, in a database, data relating to an initial state of the verification web page;
  opening the verification web page and identifying data relating to an opened state of the verification web page;
  comparing the data relating to the initial state and the data relating to the opened state of the verification web page; and
  based on detected differences between the data relating to the initial state and the data relating to the opened state of the verification web page, identifying at least one modified code fragment of the verification web page.

20. The non-transitory computer readable medium of claim 19, wherein the opening of the verification web page comprises opening the verification web page by a web browser.

* * * * *